(12) United States Patent
Gisinger et al.

(10) Patent No.: US 6,739,611 B2
(45) Date of Patent: *May 25, 2004

(54) FORCE-SENSING FIFTH WHEEL

(75) Inventors: Jack L. Gisinger, Holland, MI (US); Gerald W. Hungerink, Holland, MI (US); Steven C. Dupay, Holland, MI (US); Randy L. Schutt, Holland, MI (US)

(73) Assignee: The Holland Group, Inc., Holland, MI (US)

( * ) Notice: Subject to any disclaimer, the term of this patent is extended or adjusted under 35 U.S.C. 154(b) by 140 days.

This patent is subject to a terminal disclaimer.

(21) Appl. No.: 09/978,878

(22) Filed: Oct. 16, 2001

(65) Prior Publication Data

US 2002/0067025 A1 Jun. 6, 2002

Related U.S. Application Data

(63) Continuation-in-part of application No. 09/457,900, filed on Dec. 9, 1999, now Pat. No. 6,302,424.

(51) Int. Cl.⁷ .............................................. B60D 53/06
(52) U.S. Cl. ...................... 280/432; 280/439; 73/862.57
(58) Field of Search ............................. 73/862.57, 767, 73/781, 862.03, 862.041; 280/432, 433, 422, 439; 177/136

(56) References Cited

U.S. PATENT DOCUMENTS

| | | |
|---|---|---|
| 1,994,388 A | 3/1935 | Erichsen |
| 3,410,135 A | 11/1968 | Reynaud |
| 4,386,533 A | 6/1983 | Jackson et al. |
| 4,659,101 A | 4/1987 | Buckley |
| 4,864,874 A | 9/1989 | Hafner |
| 5,036,714 A | 8/1991 | Christoffers et al. |
| 5,060,965 A | 10/1991 | Haefner et al. |
| 5,286,094 A | 2/1994 | Milner |
| 5,289,435 A | 2/1994 | Milner et al. |
| 5,435,194 A | 7/1995 | Schedrat et al. |
| 5,438,881 A | 8/1995 | Schedrat et al. |
| 5,493,920 A | 2/1996 | Schedrat et al. |
| 5,511,812 A | 4/1996 | Milner |
| 5,526,702 A | 6/1996 | Schedrat et al. |
| RE35,301 E | 7/1996 | Reichow |

FOREIGN PATENT DOCUMENTS

| | | |
|---|---|---|
| EP | 0437284 | 7/1991 |
| NL | 1008155 | 8/1999 |

*Primary Examiner*—Daniel G. DePumpo
(74) *Attorney, Agent, or Firm*—Price, Heneveld, Cooper, DeWitt & Litton, LLP

(57) ABSTRACT

A sensing system employs multiple sensors utilizing mounting structure integrated into a fifth wheel hitch and which is protected from the environment, is capable of accurately measuring forces along longitudinal and vertical axes for providing information as to roll, pitch, yaw, and drawbar load and which utilizes sensors which provide output signals for display and control. In one embodiment, a fifth wheel includes mounting boxes formed on an undersurface thereof on opposite sides of the kingpin receiving slot and a force-sensing unit mounted within each of said mounting boxes. Each force-sensing unit includes a vertical sensor positioned fore and aft of the vertical hitch axis and forward and aft horizontal force sensors.

39 Claims, 13 Drawing Sheets

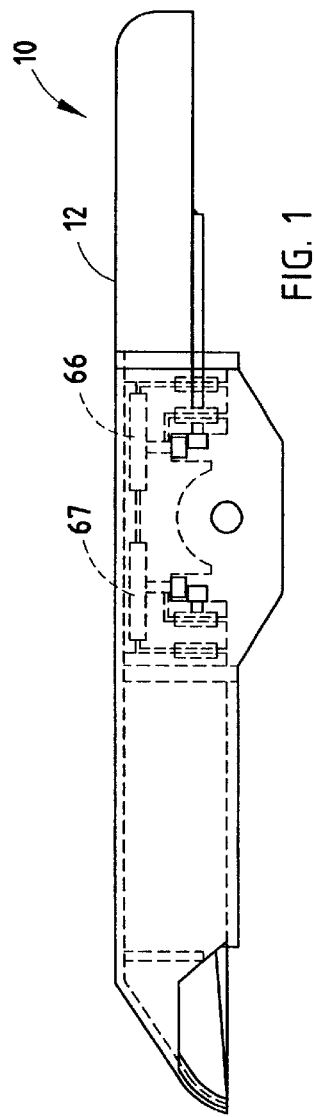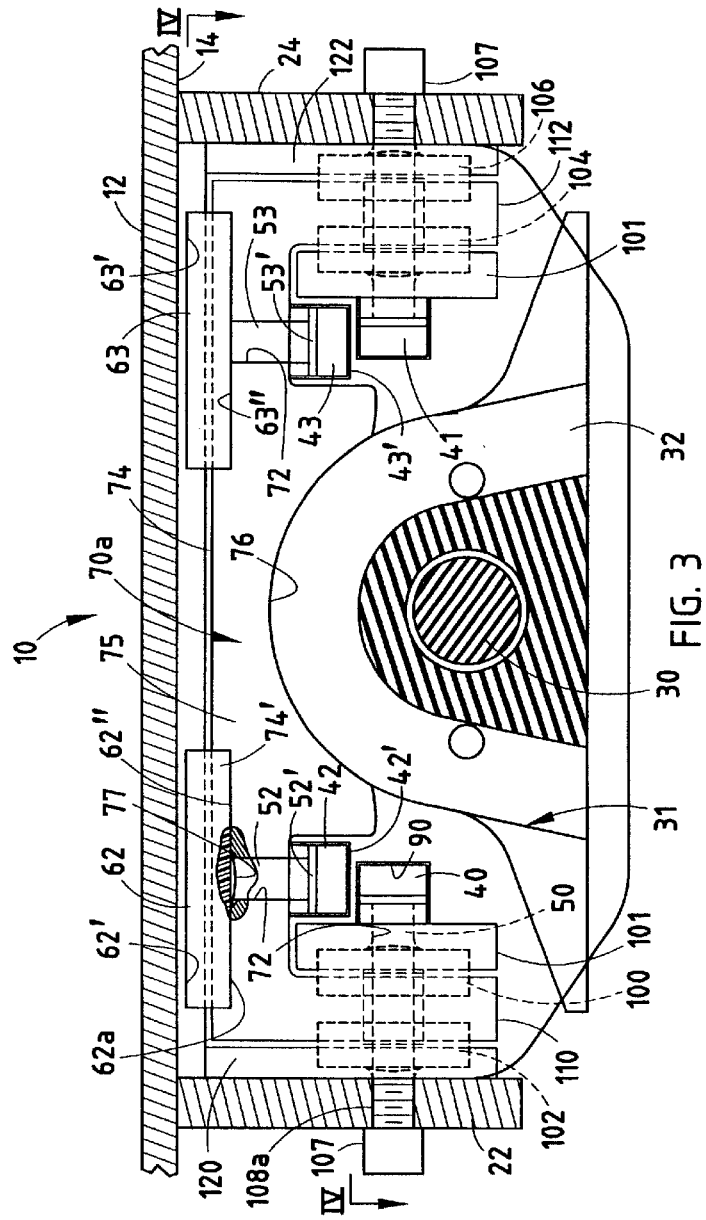

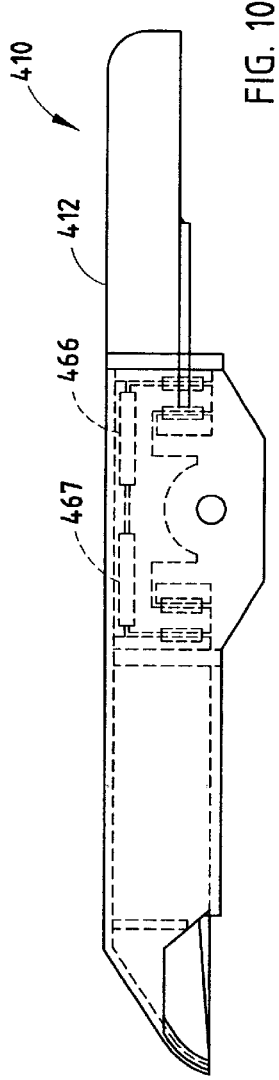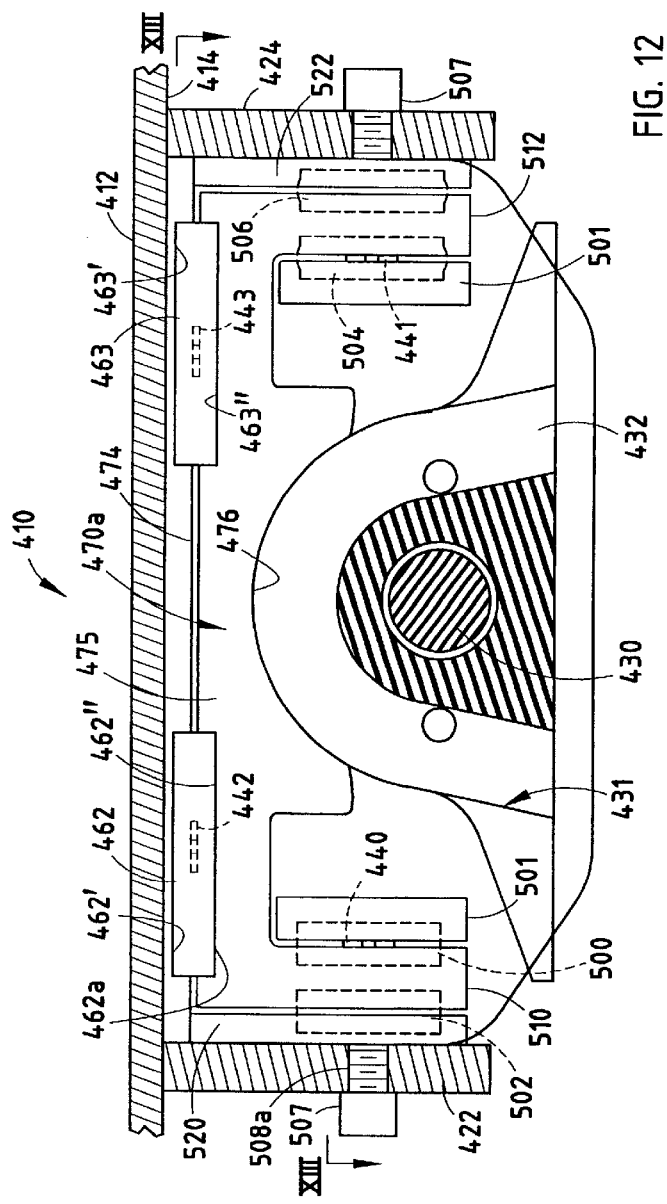

FORCE-SENSING FIFTH WHEEL

CROSS-REFERENCE TO RELATED APPLICATIONS

This application is a continuation-in-part of U.S. patent application Ser. No. 09/457,900 (now U.S. Pat. No. 6,302,424, entitled "FORCE-SENSING FIFTH WHEEL," by Applicants Jack L. Gisinger et al., filed on Dec. 9, 1999 now U.S. Pat. No. 6,302,424, the entire disclosure of which is incorporated herein by reference.

BACKGROUND OF THE INVENTION

The present invention relates to a fifth wheel hitch for receiving a kingpin of a trailer and one which has the ability to sense forces between the trailer bolster plate, kingpin and the fifth wheel and a circuit to process such sensed information.

The identification of forces between a truck trailer and a truck hitch is useful for a variety of reasons. Such information can be employed, for example, in an automatic braking system whereby signals from a sensing system can be employed to prevent excessive braking on one or more wheels or otherwise control braking for safe deceleration. In addition, such systems are helpful in alerting the vehicle operator to excessive trailer movement, such as pitching, yaw and/or potentially dangerous roll conditions.

As can be appreciated, the interconnection between a trailer kingpin and a fifth wheel assembly provides a relatively harsh environment for detection of the large forces involved and efforts to provide accurate sensing information with signals from a sensor which are linearly related to the detected forces has been difficult. U.S. Pat. Nos. 5,286,094 and 5,289,435 represent one sensor construction and a mounting employed for measuring push and pull forces on a hitch connection. It would be desirable, however, to provide additional information such as pitch, yaw and roll information for use by the driver in safely operating the vehicle.

The sensing of multiple axis force information between the coupling of a trailer to a tractor is difficult not only due to the harsh environment to which the equipment is exposed but also the relatively large and rapidly varying forces encountered and finally the difficulty in providing a linear output signal from sensors which may be employed.

SUMMARY OF THE INVENTION

The system of the present invention provides a sensing system which employs multiple sensors utilizing a mounting structure which can be integrated into a fifth wheel hitch and which is protected from the environment and capable of accurately measuring forces along longitudinal and vertical axes for providing information as to roll, pitch, and yaw. The system utilizes sensors which provide a relatively linear electrical output signal which can be used for displaying such forces, for generating alarms, or for controlling the vehicle operation.

Systems embodying the present invention comprise a fifth wheel having mounting boxes formed on an undersurface thereof on opposite sides of the kingpin receiving slot and a force-sensing unit mounted within each of said mounting boxes. Each force-sensing unit includes a forward and aft vertical sensor and a forward and aft longitudinal sensor. With a force-sensing unit on the left-side and the right-side of the fifth wheel assembly, eight such sensors provide signal information which can be used to determine roll, pitch and yaw movements derived from the detected vertical and longitudinal forces on the hitch.

In one embodiment of the invention, each of the sensors are mounted to the sensing unit utilizing elastomeric springs coupling the fifth wheel plate to the force-sensing unit and a plunger for coupling forces from said elastomeric spring to a force sensor itself. In this embodiment, the longitudinal sensors also include a pair of elastomeric springs for pre-loading the sensor such that it is capable of sensing forces in both directions. Also, in one embodiment of the invention, the plungers are mounted within a cylindrical aperture having a curved opening allowing the elastomeric spring to deform linearly into contact with the plunger as force is applied thereto.

With such a system, a force-sensing fifth wheel assembly is provided which measures forces in vertical and horizontal axes between the kingpin coupling to the fifth wheel and provides accurate signal information to an electrical circuit which can display pitch, roll and yaw and vertical load information to the vehicle for use in controlling the safe operation of the vehicle.

According to another embodiment of the present invention, a force-sensing unit for a fifth wheel assembly includes a housing, a first vertical sensor, a second vertical sensor, a first horizontal sensor and a second horizontal sensor. The housing is coupled to a fifth wheel between a tractor mountable bracket and a fifth wheel. The first vertical sensor is positioned in the housing forward of the lateral axis of the fifth wheel and the second vertical sensor is positioned in the housing rearward of the lateral axis of the fifth wheel. The first horizontal sensor is positioned in the housing forward of the lateral axis of the fifth wheel and the second horizontal sensor is positioned in the housing rearward of the lateral axis of the fifth wheel. In this manner, the force-sensing unit provides a total of four channels of force-sensing information, with each of the sensors being embedded within an elastomeric pad.

These and other features, objects and advantages of the present invention will become apparent upon reading the following description thereof together with reference to the accompanying drawings.

BRIEF DESCRIPTION OF THE DRAWINGS

FIG. 1 is a right-side elevational view of a fifth wheel assembly, according to a first embodiment of the present invention;

FIG. 3 is an enlarged, fragmentary cross-sectional view of the left-side force-sensing unit taken along section lines III—III of FIG. 2;

FIG. 10 is a right-side elevational view of a fifth wheel assembly according to another embodiment of the present invention;

FIG. 12 is an enlarged, fragmentary cross-sectional view of the left-side force-sensing unit taken along section lines XII—XII of FIG. 11;

DETAILED DESCRIPTION OF THE PREFERRED EMBODIMENTS

Figure 2:
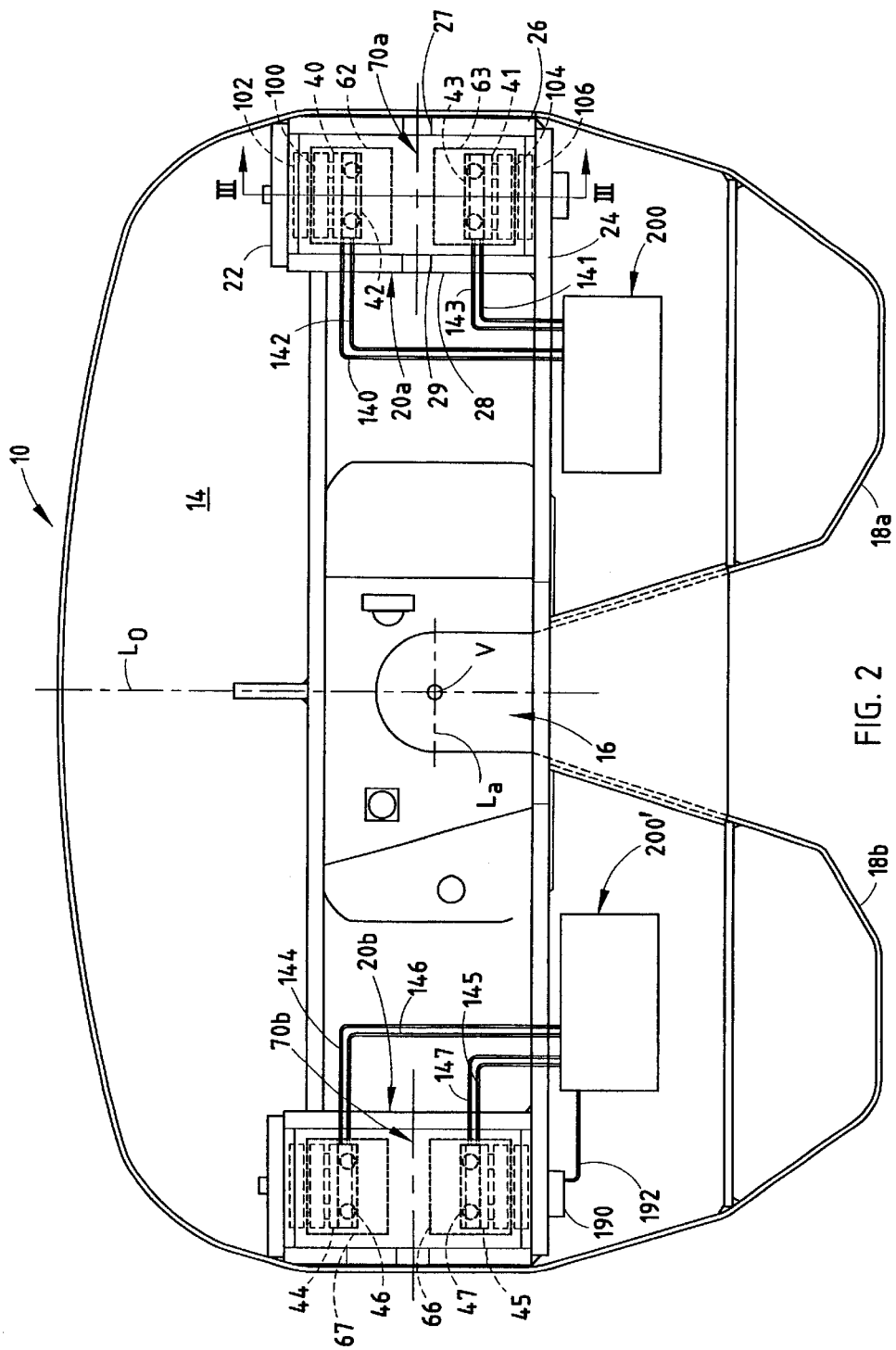
FIG. 2 is an enlarged bottom plan view of the fifth wheel shown in FIG. 1.

Referring initially to FIGS. 1–3, there is shown a fifth wheel 10 embodying the present invention which includes a top surface 12 (FIGS. 1 and 3), a bottom surface 14 (FIGS. 2 and 4), and a kingpin receiving slot 16 (FIG. 2) defined by bifurcated projections 18a and 18b for the left-side and right-side of the fifth wheel, respectively. Extending downwardly from the undersurface 14 of the fifth wheel 10 is a left-side mounting box 20a and a right-side mounting box 20b, each box being substantially the same and symmetrical. Each of the mounting boxes 20a, 20b receive a force-sensing unit 70a, 70b, respectively, described in greater detail below. Each of the boxes 20a and 20b are substantially identical and mirror images of one another, as are the force-sensing units 70a and 70b. Accordingly, following is a detailed description of the force-sensing unit 70a and its mounting relationship with respect to the fifth wheel 10, it being understood that force-sensing unit 70b is structurally substantially the same. The eight sensors are, however, separately identified, as are the signals provided by the fifth wheel sensing unit of the present invention.

The mounting box 20a (FIGS. 2–4) includes a forward wall 22, a rear wall 24, which may extend the width of the fifth wheel 10 and thereby also function as a strengthening rib, an outside wall 26 and an inside wall 28. Outside wall 26 includes an aperture 27 aligned with an aperture 29 in wall 28 for receiving a mounting pin 30 (FIG. 3), which couples the fifth wheel 10 to a tractor mounting bracket 32 secured to a tractor frame. The coupling of the fifth wheel 10 to the mounting bracket 32 is conventional and may employ an elastomeric interface 31 which, together with mounting pin 30, secures the fifth wheel 10 to the tractor. It is understood, however, that the force-sensing units 70a and 70b interface between mounting brackets 32 and the fifth wheel 10 such that all of the forces transmitted between the kingpin and the fifth wheel assembly 10 are transmitted through the force-sensing units 70a and 70b. Not shown in FIGS. 1 and 2 is the kingpin locking mechanism or other mechanical details of the fifth wheel assembly, which are described in greater detail in U.S. Pat. No. 4,659,101, the entire disclosure of which is incorporated herein by reference.

Before describing the force-sensing unit 70a (and the substantially identical forcesensing unit 70b) in detail, the location of the eight sensors employed in the system of the present invention with respect to the longitudinal axis "$L_0$" (FIG. 2 of the fifth wheel 10) and lateral axis "$L_a$", which intersect at the vertical axis V, are described in connection with FIGS. 1 and 2. The left-side of the fifth wheel assembly includes a forward longitudinal (horizontal) sensor 40 and an aft longitudinal (horizontal) sensor 41 as best seen in FIGS. 2 and 3. The left sensing unit 70a also includes a forward vertical sensor 42 and an aft vertical sensor 43. Similarly, the right force-sensing unit 70b includes a forward longitudinal (horizontal) sensor 44, an aft longitudinal (horizontal) sensor 45, a forward vertical sensor 46, and an aft vertical sensor 47. The placement of the sensors and their mounting to the boxes 20a and 20b of the fifth wheel 10 is shown in FIGS. 1–4. Each of the sensors 40–47 may be capacitive sensors that include a pair of conductive plates spaced from one another and mounted within a compressible bellows-type assembly, which includes air and a dielectric material between the conductive plates. The capacitive sensors can be generally of the type disclosed in U.S. Pat. Nos. 5,286,094 and 5,289,435, the entire disclosures of which are incorporated herein by reference. Other sensors which can withstand the load levels encountered in this environment can also be used. The forces transmitted to the sensor, as described in greater detail below, causes the movement of the plates toward and away from one another a distance of approximately 2 mm, which results in a capacitance change which is employed to provide electrical signals for use with the electrical control circuit shown in FIG. 9 and described below.

Figure 5:
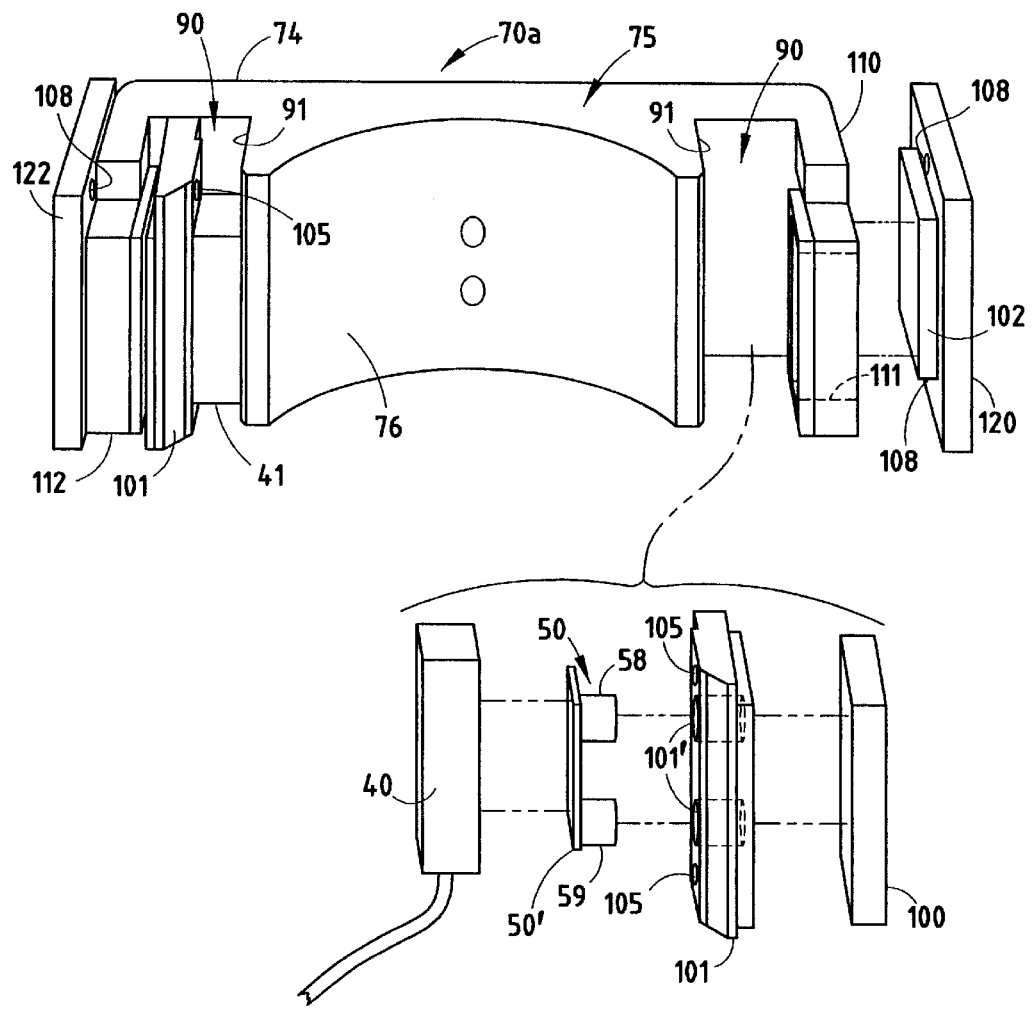
FIG. 5 is an enlarged, partly exploded, perspective view of one of the force-sensing units, according to one embodiment of the present invention.
Figure 6:
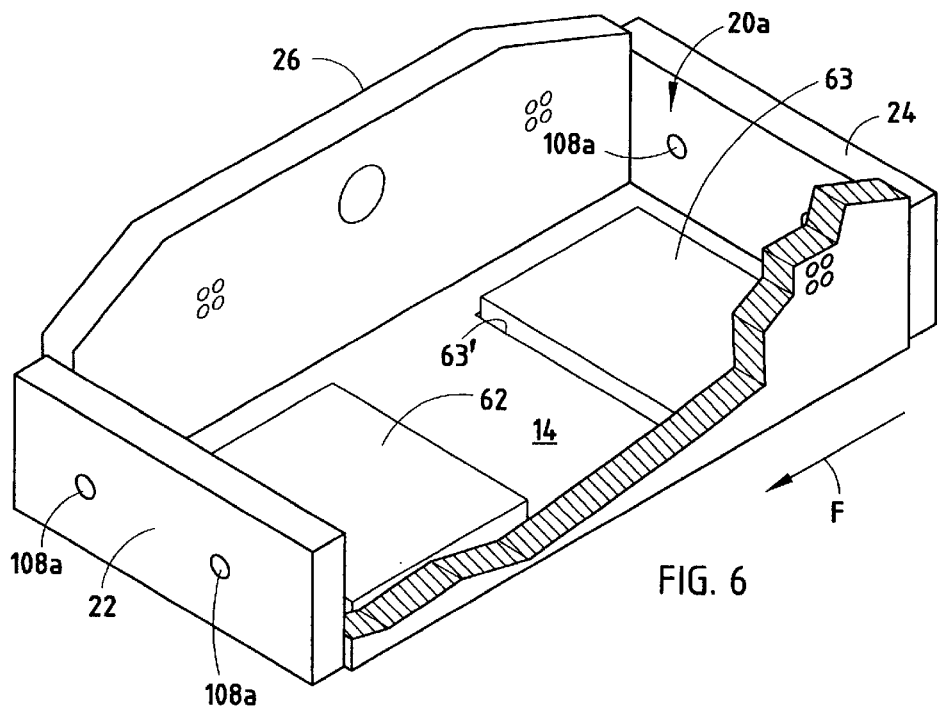
FIG. 6 is a fragmentary perspective view, partly broken away, of the left bottom side of the fifth wheel shown in FIGS. 1–4, with the force sensor removed therefrom.
Figure 7:
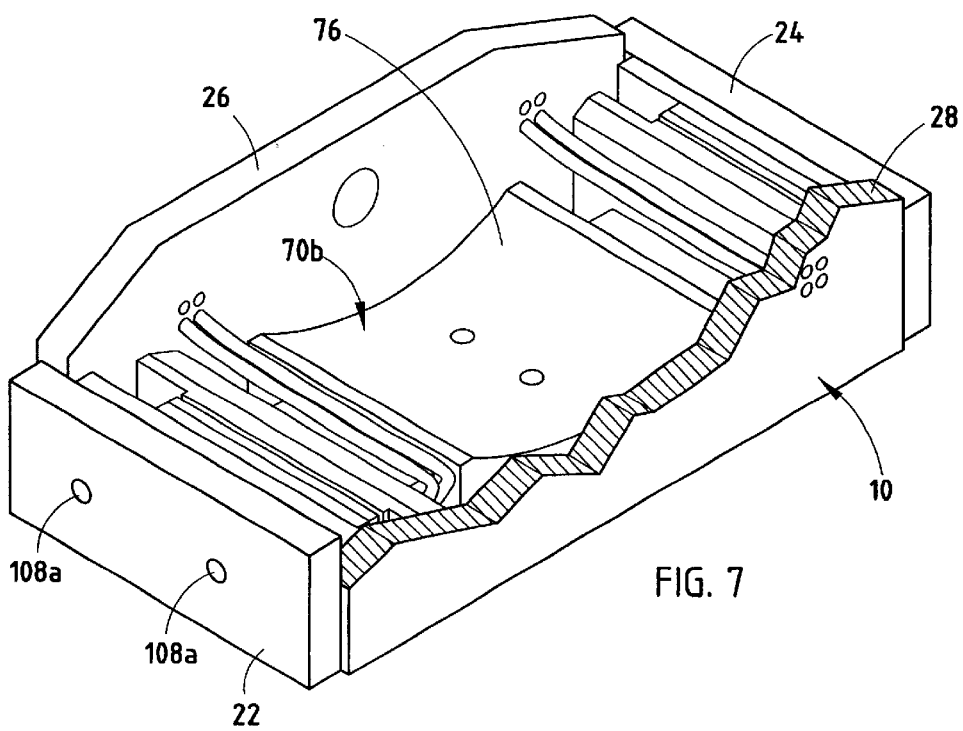
FIG. 7 is a fragmentary perspective view of the structure shown in FIG. 6, with the force-sensing unit installed therein.

As is best seen in FIGS. 3 and 5, each of the force-sensing units 70a and 70b include a body 75 having semicylindrical downwardly formed surface 76 which mates with a similarly shaped mounting bracket 32, as seen in FIG. 3. The top surface 74 of the body 75 is positioned in a spaced relationship to the lower surface 14 of fifth wheel 10 with four elastomeric springs, which are pads 62, 63, 66, and 67 positioned in pockets (i.e., pockets 62' and 63' for pads 62 and 63, respectively) formed in the lower surface 14 of fifth wheel plate as best seen in FIGS. 3 and 6 for the left-side illustrated. Similarly, the right-side includes pockets for receiving the elastomeric springs, e.g., polymeric pad for the right-side force-sensing unit. Thus, the elastomeric springs fore and aft of the lateral axis $L_a$ of the fifth wheel 10 on each side of the longitudinal axis $L_o$ provide the interface between the fifth wheel plate and the force-sensing units 70a and 70b.

In a preferred embodiment of the invention, the vertical elastomeric springs 62, 63, 66 and 67, as well as the longitudinal elastomeric springs described below are made of natural rubber, having a 60 IRHD, although polyurethane or other elastomeric materials having minimal hysteresis can be employed as well. In one embodiment, the vertical pads 62, 63, 66 and 67 are approximately 90 mm by 70 mm and have a thickness or depth, as viewed in FIG. 3, of approximately 15 mm. The top surface 74 of the force-sensing unit bodies 75 likewise includes pockets (e.g., pockets 62" and 63" (FIG. 3)) for receiving the resilient elastomeric pads, e.g., pads 62 and 63, leaving a gap between the lower surface 14 of the fifth wheel and the top surface 74 of a force-sensing unit sufficient to allow the elastomeric springs to deform under the compressive vertical forces provided by the kingpin coupled to the fifth wheel.

The vertical pads 62, 63 engage spaced pairs of cylindrical plungers 52, 53 slidably extending in cylindrical apertures 72 of the body 75 which apertures extend downwardly from the floor of spring-receiving pockets 62" and 63" defining an interface having a shallow concave recess 77, as best seen in FIG. 3, such that the lower surface 62a, for example, of spring 62 can deform into the aperture 72 and engage the end of plunger 52 moving in a distance linearly related to the vertical force applied to the fifth wheel. The concave recess 77 and each of the interfaces between the vertical springs and the associated plungers 52 assure such forces are linearly translated into plunger motion that is transferred to the associated sensor 42. Sensors 42, 43, 46 and 47 are mounted in associated pockets (i.e., pockets 42' and 43' for sensors 42 and 43) formed in body 75 such that the vertical forces on plate 12 are transmitted through pads 62, 63, 66, 67 and their associated plunger assemblies to the sensors 42, 43, 46 and 47. Electrical conductors 142, 143, 146 and 147 (FIGS. 2 and 9) electrically couple the sensors to the signal processing circuits 200, 200' on the protected undersurface 14 of the fifth wheel 10. Each of the four vertical sensors 42, 43, 46 and 47 are of substantially identical construction as are the mating cylindrical apertures 72, recesses 77 and plungers associated therewith.

With reference now to FIG. 5, the horizontal or longitudinally extending sensors 40, 41, 44 and 45 are mounted within recesses 90 formed in the body 75 of each of the force-sensing units 70a and 70b. As shown, the sensor 40 is captively held to plate 101 by opposed facing slots 40b (FIGS. 8 and 8A) that engage a mounting clip 103' (FIG. 8A). The clip 103' is welded to a top surface of plate 101 such that edges 105' are spaced above the top surface. The clip 103' includes a stop tab 109 for positioning the sensor 40 with respect to the plate 101 and the pressure plate 50' with the outer facing of an associated plunger 50 acted upon by a pair of elastomeric springs, such as pads 100 and 102, 104 and 106 associated with sensors 40 and 41, respectively. The clip 103' is not shown in FIG. 8 and the plunger 50 is not shown in FIG. 8A. A pair of stacked serially coupled elastomeric springs are used in connection with each of the longitudinal or horizontal force sensors 40, 41, 44 and 45 to allow preloading of the sensors such that both acceleration and deceleration forces are detected by each of the four horizontal sensors (two on each side of the longitudinal axis $L_o$ of the fifth wheel).

The elastomeric springs, such as pads 100 and 102, are mounted on opposite sides of a downwardly extending intermediate plate 101 with apertures 101' (FIG. 8) for receiving plungers 58 and 59 of the plunger 50. Each of the plates 101 includes a rectangular seat 103 (FIG. 8) for receiving an elastomeric spring or pad, such as pad 100 illustrated in FIGS. 5 and 8. The outer walls 110 and 112 of recesses 90 have rectangular apertures 111 therethrough to allow elastomeric pads, such as pad 102 mounted on end plate 120, to engage pad 100 for preloading its associated sensor 40 as described below.

Figure 4:
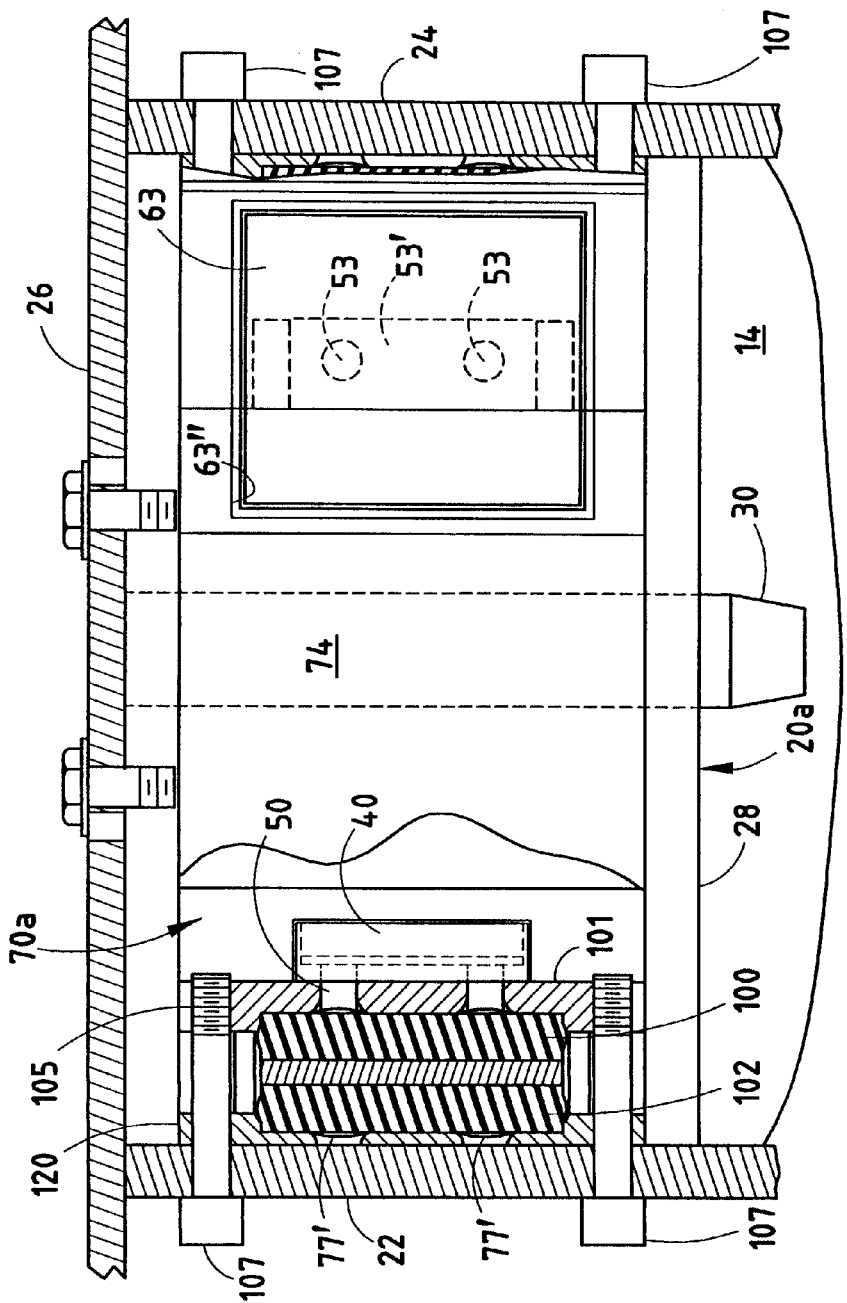
FIG. 4 is an enlarged, fragmentary bottom plan view, partly broken away and in cross section, of the sensing unit shown in FIG. 3.

End plates 22 and 24 extend over the outer plates 120 and 122 (FIG. 3) and include apertures 108a for receiving a pair of spaced, threaded fasteners 107 at the forward and aft sides of each of the two sensing units for preloading the sensors 40, 41, 44 and 45 for each of the two sensing units. Fasteners 107 are threadably received by threaded apertures 105 in plates 101, as best seen in FIG. 4. Thus, the tightening of fasteners 107 compresses the elastomeric springs or pads 100 and 102, 104 and 106, and the corresponding springs on the opposite side of the force-sensing units for each of the force sensing units to deflect plungers 50 into engagement with corresponding sensors 40, 41, 44 and 45 for preloading the sensors. The elastomeric springs 100, 102, 104, and 106 also communicate with apertures 72 having a bell-shaped concave entrance 77' (FIGS. 3 and 4) similar in shape to that of the vertical sensors discussed above such that the extrusion of the elastomeric springs into the apertures 72 translate the forces applied to the hitch from the trailer in a linear motion which is transferred to the horizontal sensors to provide a linear output signal in response thereto.

In a preferred implementation of the first embodiment of the invention, each of the concave radii surrounding the corresponding cylindrical apertures 72 for each of the vertical and horizontal sensor plungers have a radius of about 2 mm such that the diameter of the concave entry recesses 77 and 77' are approximately 4 mm larger than the diameter of apertures 72 for receiving the plungers associated with each of the plunger assemblies 50. Each of the longitudinal springs 100, 102, 104, and 106, in a preferred embodiment, have a dimension of approximately 73 mm by 36 mm and a thickness (left to right in FIG. 3) of approximately 13 mm and are made of the same material as that of the vertical springs discussed above.

Figure 8:
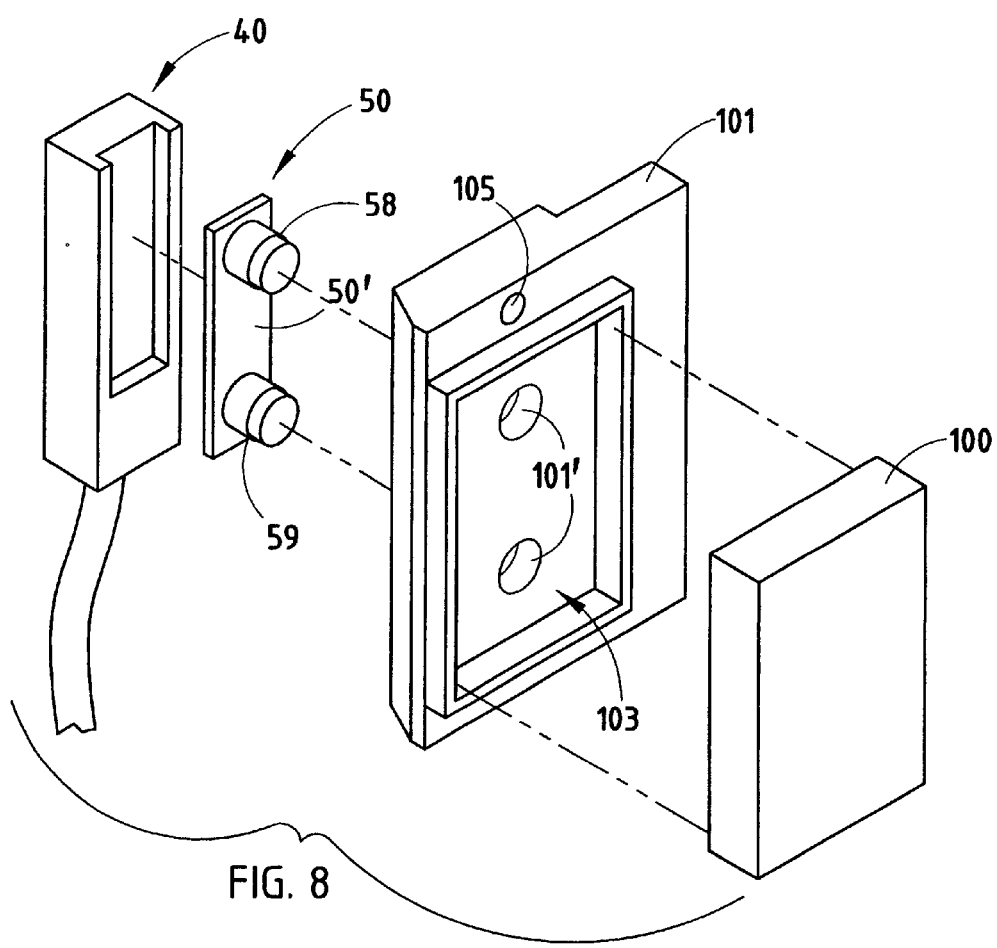
FIG. 8 is an enlarged perspective, exploded view of one of the horizontal (longitudinal) sensors for mounting to one of the force-sensing units.
Figure 8A:
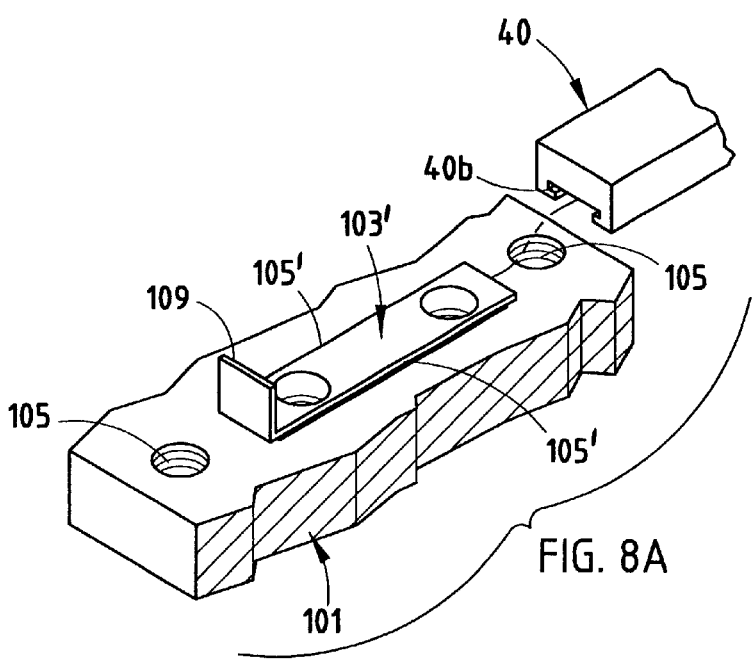
FIG. 8A is an enlarged exploded view of a horizontal sensor, showing its mounting relationship.

The assembly of each of the force-sensing units is illustrated in FIGS. 5 and 8, with the sensor and plungers being positioned with respect to the elastomeric springs subsequently inserted into the force-sensing unit bodies 75 as illustrated in FIG. 5, which, in turn, is mounted within the rectangular housing 20a, as shown in FIG. 6, into which the vertical springs 62 and 63 have previously been mounted. With the force-sensing unit partially assembled, fasteners 107 are extended through aperture 108a in the plates 22 and 24, apertures 108 in the plates 120 and 122 and into the apertures 105 in plates 101 of the assembly to preload the longitudinal sensors 40, 41, 44 and 45 with the elastomeric springs 100, 102, 104, and 106 deforming into the bell-shaped recesses 77' communicating with aperture 72 to move plungers 50 into engagement with the sensors 40, 41, 44 and 45 for preloading the sensors such that acceleration and deceleration forces can be sensed by each of the four longitudinal sensors.

Each of the sensors 40–47 are coupled by conductors 140 through 147 (FIGS. 2 and 9) comprising coaxial conductors which couple each of the sensors to interface electrical circuits 200 and 200' for processing the signals for each of the force-sensing units. A temperature sensor 190 may also be coupled to the fifth wheel at a convenient location, such as on wall 24, as shown in FIG. 2, and coupled to at least electrical circuit 200, via conductor 192.

Figure 9:
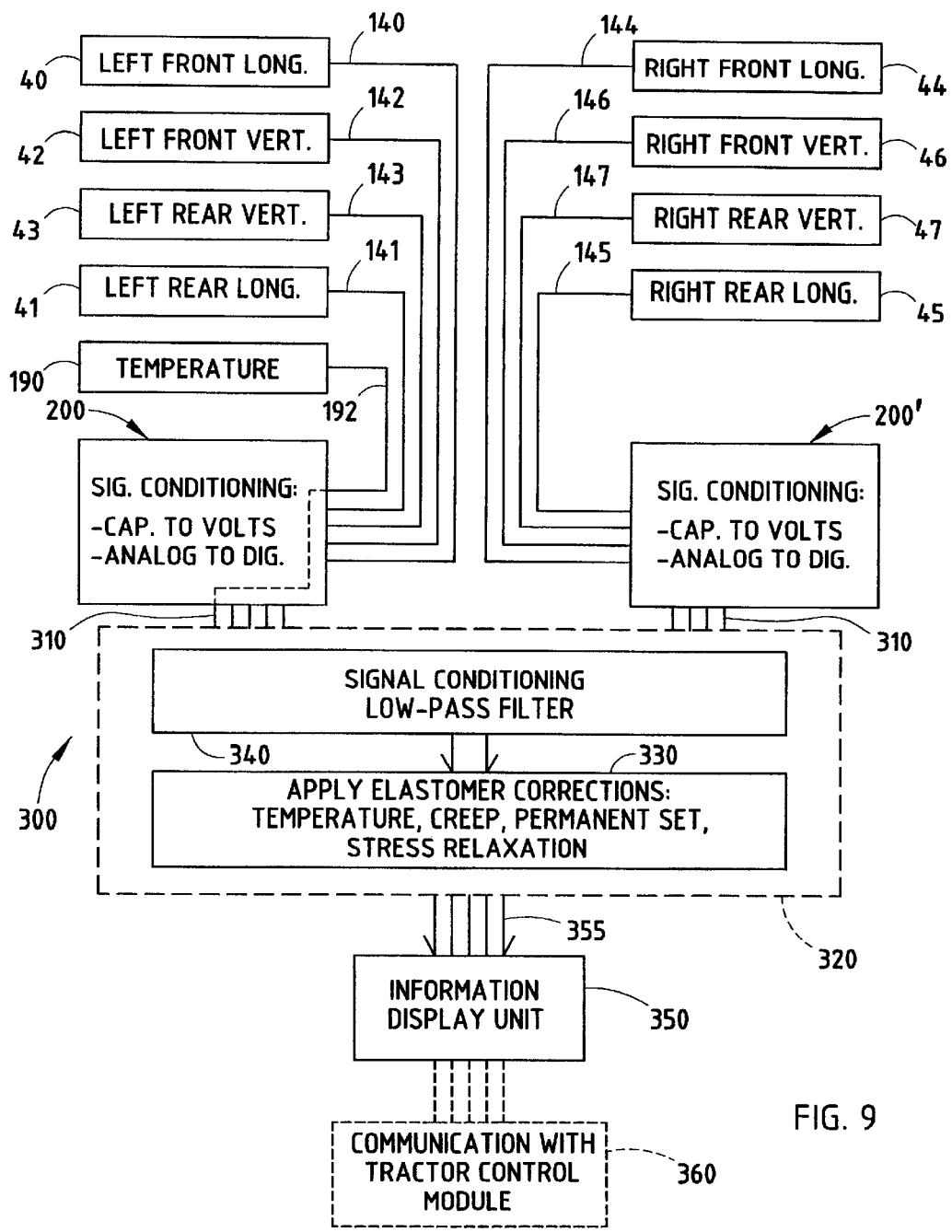
FIG. 9 is an electrical circuit diagram in block form of a circuit employed to utilize the information provided by one embodiment of the force-sensing system of the present invention.

Having described the mechanical construction of the sensors, the sensor actuating plungers, and the elastomeric springs together with their relationship to each of the sensing units and the relationship of the sensing units to the fifth wheel under frame, a description of the electrical circuit 300 shown in FIG. 9 and the signals from the sensors are now briefly described in connection with FIG. 9.

The capacitive sensors 40–47 are coupled to circuits 200 and 200', which are of a conventional design such as a voltage controlled oscillator which responds to a change in capacitance to change the frequency thereof, which frequency can be converted to a digital signal representative of the frequency and, therefore, the capacitance which is related to the force applied to the sensors from the kingpin applying pressure on the fifth wheel. Forces on the vertical sensors range from approximately 0 up to 160,000 Newtons with 80,000 Newtons on the left-side and right-side. The longitudinal forces applied to the longitudinal sensors varies from −80,000 Newtons to +80,000 Newtons. Circuits 200 and 200' are coupled by suitable electrical conductor 310 mounted to the under-surface of the fifth wheel and coupled to the electrical circuit 320 mounted to the vehicle itself.

Circuit 320 includes a microprocessor 330, which is coupled to conductors 310 through suitable interface circuit 340 and to an information display unit 350 via bus 355 in a conventional manner. Microprocessor 330 is programmed to apply any corrective information for the elastomeric material as a function of the temperature detected by the temperature sensor 190 and responds to the signals from each of the eight sensors to provide left and right vertical load information which can be added and subtracted to provide roll moment information. Further, the eight signals are employed by detecting the front and rear vertical loads, which can be added and subtracted to provide pitch moment information. The four vertical sensors are added to provide total vertical load information while the longitudinal left and right signals can be added and subtracted to provide yaw information, all of which can be supplied to the information display unit 350. These signals also can be applied to a tractor control module 360, which may include a microprocessor and which is typically provided by the tractor manufacturer for limiting braking activity for safe deceleration of the vehicle and trailer or for providing warning signals to the driver indicating excessive pitch, yaw or tendency to roll, such that the driver can respond to audible or visual alarm signals to control the tractor trailer safely.

Thus, with the system of the present invention, signals are provided for use by the vehicle operator which accurately measures the coupling forces extending between the trailer and tractor in vertical and horizontal directions to the left and right of and forward and aft of the vertical axis of the kingpin. The system provides electrical signals, which are related in a known manner to the forces applied from the trailer to the tractor by the improved force-sensing units of the present invention.

Figure 11:
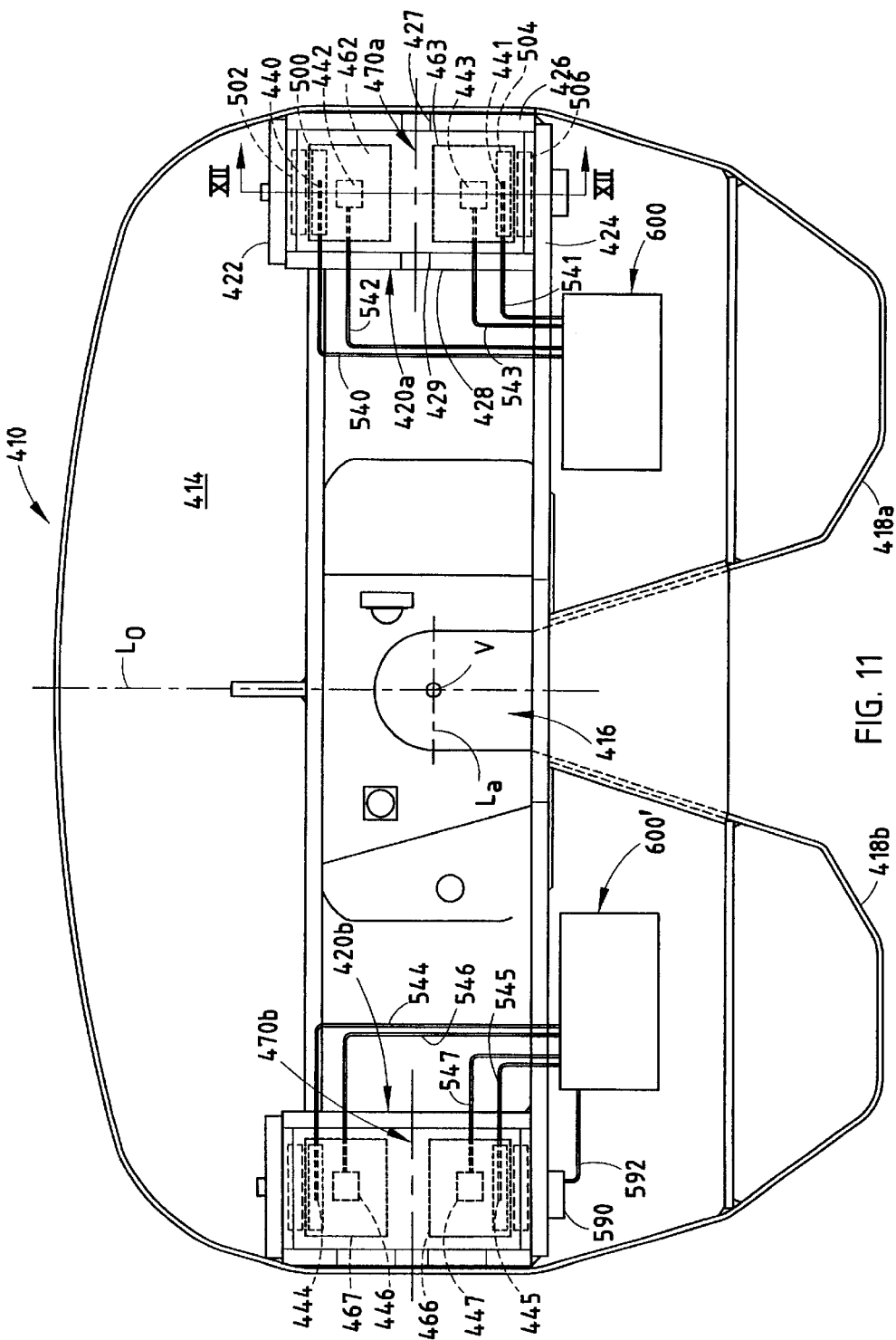
FIG. 11 is an enlarged bottom plan view of the fifth wheel shown in FIG. 10.

FIGS. 10–17 depict a fifth wheel 410, according to another embodiment of the present invention. With reference to FIG. 10, which is a right-side elevation view of the fifth wheel 410, a forward vertical pad 467 and an aft vertical pad 466 each include a sensor embedded within the pads. In this manner, the pressure that builds up in the pads 466 and 467 when they are under a load can be measured. Such a system may generally be more reliable and also may generally provide more repeatable results than a system that implements an actuator type system, such as the system described with respect to FIGS. 1–9. FIG. 11 is an underside view of the fifth wheel 410 depicting the various components associated with force-sensing units 470a and 470b. The force-sensing units 470a and 470b are located within pockets 420a and 420b, respectively, of the fifth wheel 410. Similar to the fifth wheel 10 of FIG. 2, the fifth wheel 410 includes a throat 416 that accepts a kingpin and is defined by bifurcated projections 418a and 418b for the left-side and right-side, respectively, of the fifth wheel 410. The mounting boxes 420a and 420b are substantially the same and symmetrical and each contain a force-sensing unit 470a or 470b, respectively, as is further described in more detail below.

Figure 18:
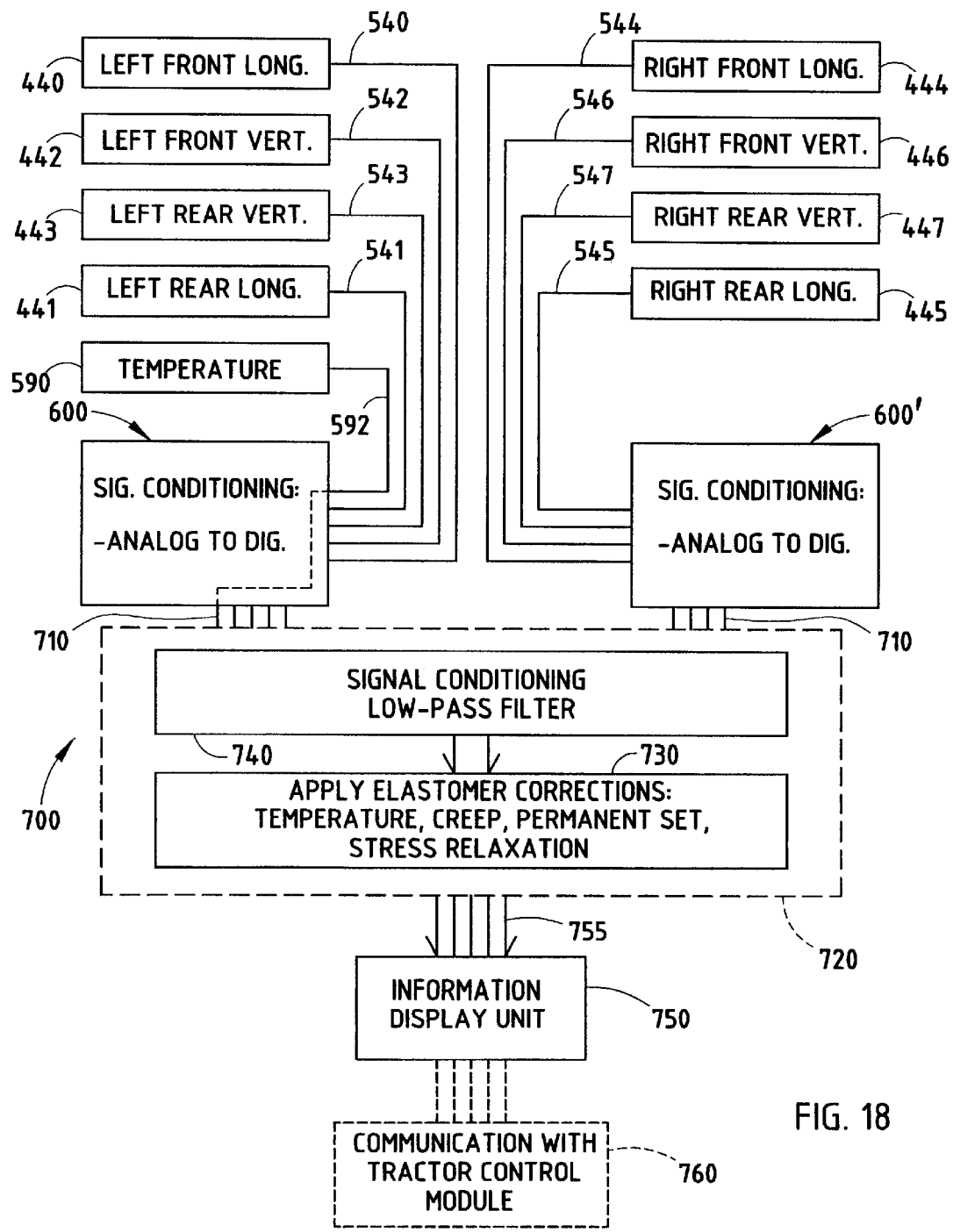
FIG. 18 is an electrical circuit diagram in block form of a circuit employed to utilize the information provided by one embodiment of the force-sensing system of the present invention.

As the force-sensing units 470a and 470b and the boxes 420a and 420b are substantially the same, the following description is limited to a description of the force-sensing unit 470a and its mounting relationship with respect to the fifth wheel 410. It should be understood that the force-sensing unit 470b is structurally similar to the force-sensing unit 470a. Each of eight sensors 440–447 are separately identified as each of the sensors provide an individual signal to a processing unit 720 (FIG. 18), which in response to the supplied signals determines a load applied to the fifth wheel 410 by a given trailer.

The box 420a includes a forward wall 422, a rear wall 424, which may extend the width of the fifth wheel 410, an outside wall 426 and an inside wall 428. The outside wall 426 includes an aperture 427 aligned with an aperture 429 in the wall 428 for accepting a mounting pin 430 that couples the fifth wheel 410 to a tractor mounting bracket 432, which is secured to a tractor frame. The coupling of the fifth wheel 410 to the mounting bracket 432 is conventional and may employ an elastomeric interface 431, which, together with the mounting pin 430, secures the fifth wheel 410 to a tractor. The force-sensing units 470a and 470b interface between the mounting brackets 432 and the fifth wheel 410 such that the forces transmitted between the trailer and the fifth wheel assembly 410 are transmitted through the force-sensing units 470a and 470b.

As with the fifth wheel 10 (see FIG. 2), the fifth wheel 410 (see FIG. 11) includes a longitudinal axis $L_o$ and a lateral axis $L_a$, which intersect at a vertical axis V. The left-side sensing unit 470a of the fifth wheel assembly 410 includes a forward horizontal (longitudinal) sensor 440 and an aft horizontal (longitudinal) sensor 441. The sensing unit 470a also includes a forward vertical sensor 442 and an aft vertical sensor 443. Similarly, the right-side forcesensing unit 470b includes a forward horizontal (longitudinal) sensor 444, an aft horizontal (longitudinal) sensor 445, a forward vertical sensor 446 and an aft vertical sensor 447. The placement of the sensors and their mounting within the boxes 420a and 420b of the fifth wheel 410 are further illustrated in FIGS. 10–13. Each of the sensors 440–447 may be of various types, e.g., pressure sensitive films, ceramic load buttons or small cylindrical piezoceramic elements, which are embedded within elastomeric pads, which may be, for example, rubber or polyurethane.

When polyurethane pads are used they may exhibit a typical IRHD of about 80 and when natural rubber pads are used they may exhibit an IRHD of about 60. It should be appreciated that a variety of materials can be utilized that exhibit an IRHD within the range of about 60–80 providing the materials exhibit reasonably low hysterisis properties. It should be appreciated that the embodiment shown in FIGS. 10–17 does not include actuators, as the sensors are embedded within resilient pads. In this manner, the embedded sensors sense the pressure condition of the pad material without the need for a plunger, piston or actuating pin.

Figure 13:
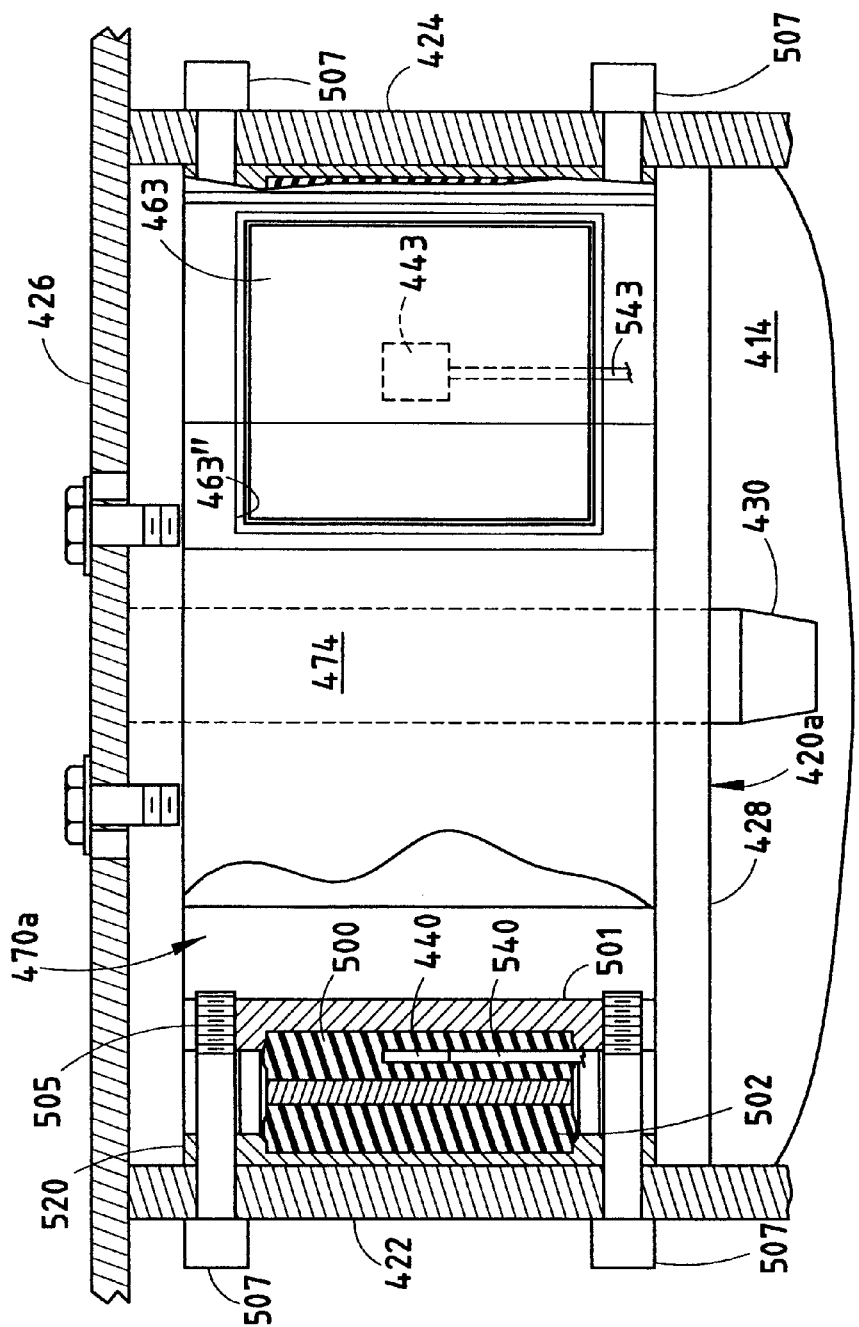
FIG. 13 is an enlarged, fragmentary bottom plan view, partly broken away and in cross section, of the sensing unit shown in FIG. 12.
Figure 14:
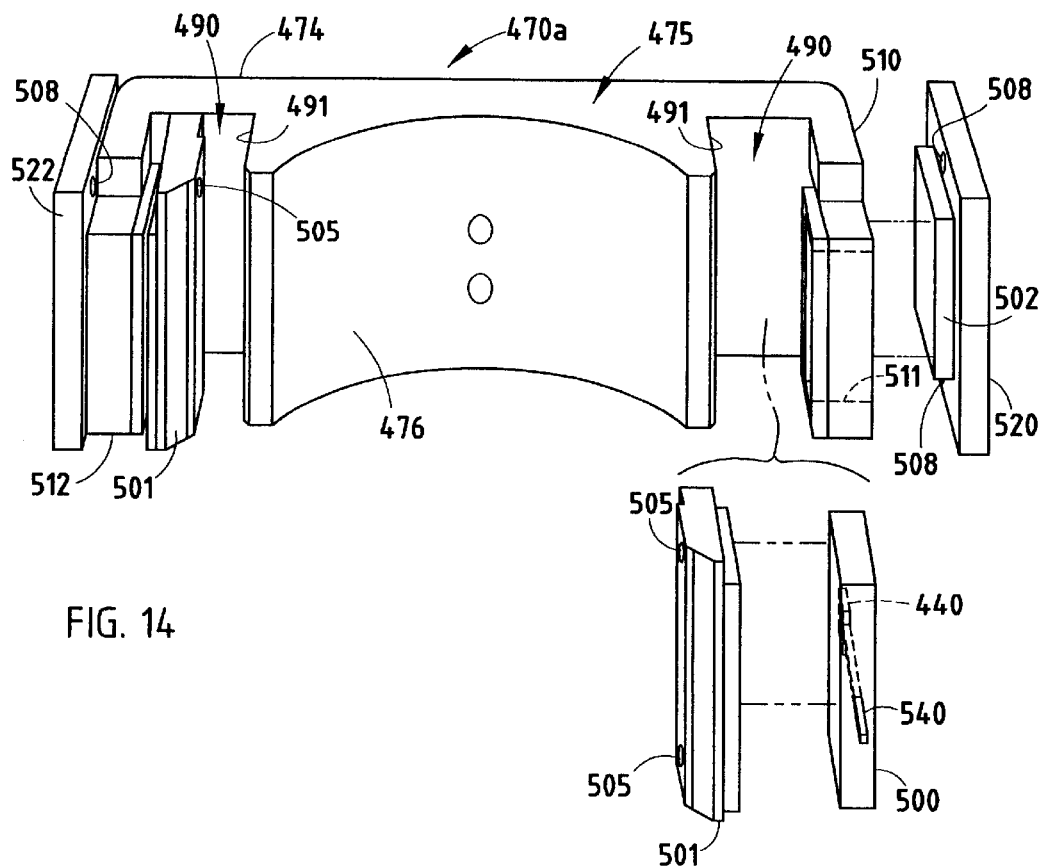
FIG. 14 is an enlarged, partly exploded, perspective view of one of the force-sensing units, according to another embodiment of the present invention.

As is best shown in FIGS. 12 and 14, force-sensing unit 470a (and 470b) includes a body 475 that has a semicylindrical downwardly formed surface 476, which mates with a similarly shaped mounting bracket 432. A top surface 474 of the body 475 is positioned in a spaced relationship to the lower surface 414 of the fifth wheel 410 with four elastomeric pads 462, 463, 466, and 467. The pads 462 and 463, as shown, are positioned in pockets 462' and 463' formed in a lower surface 414 of the fifth wheel 410. Similarly, the right-side of the fifth wheel 410 includes pockets for receiving pads for the right-side force-sensing unit. As shown in FIG. 13, the pad 463 is received by a pocket 463" within the top surface 474 of the body 475. In one embodiment, the vertical pads 462, 463, 466 and 467 are approximately 90 mm by 70 mm and have a thickness or depth, as viewed in FIG. 12, of approximately 15 mm.

The top surface 474 of the force-sensing unit body 475 likewise includes a pocket 462" for receiving the pad 462. The pads 462 and 463 provide a gap between the lower surface 414 of the fifth wheel 410 and the top surface 474 of the force-sensing unit sufficient to allow the pads 462 and 463 to deform under a compressive vertical force provided by a trailer coupled to the fifth wheel 410. Electrical conductors 542, 543, 546 and 547 electrically couple sensors 442, 443, 446 and 447, respectively, to the signal processing circuits 600 and 600' on a protected undersurface 414 of the fifth wheel 410.

Figure 17:
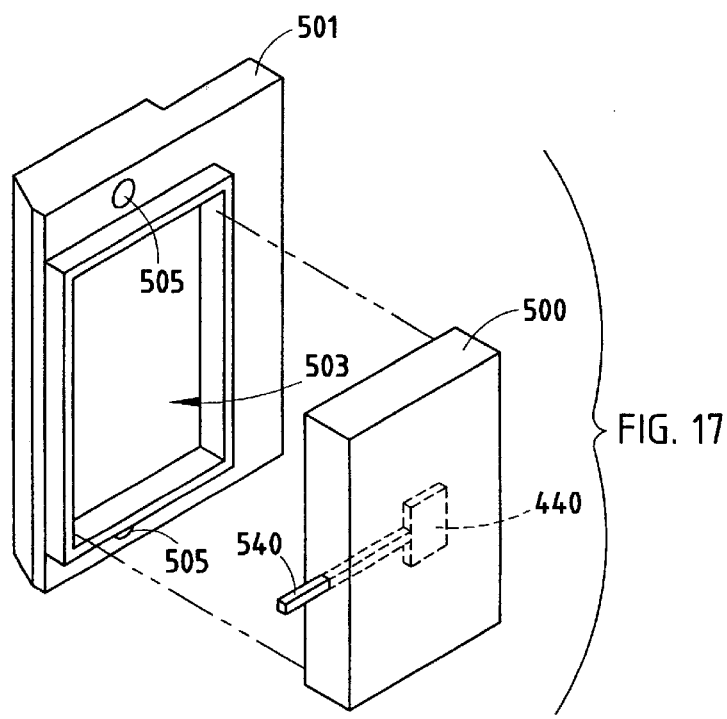
FIG. 17 is an enlarged perspective, exploded view of one of the horizontal (longitudinal) sensors for mounting to one of the force-sensing units.
Figure 15:
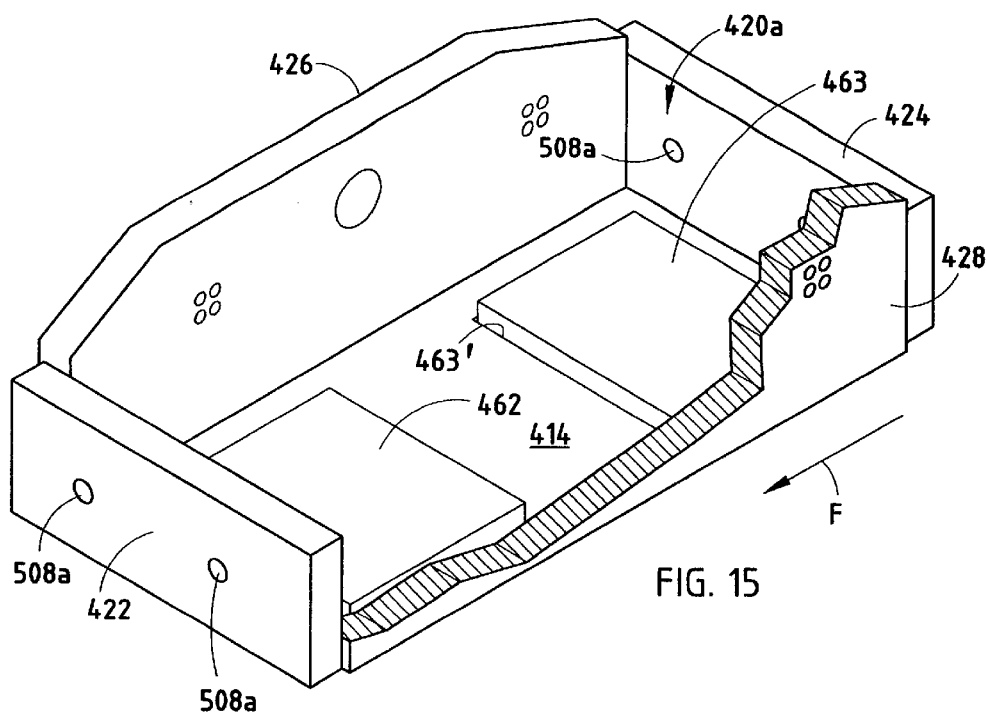
FIG. 15 is a fragmentary perspective view, partly broken away, of the left bottom side of the fifth wheel shown in FIGS. 10–13, with the force sensor removed therefrom.
Figure 16:
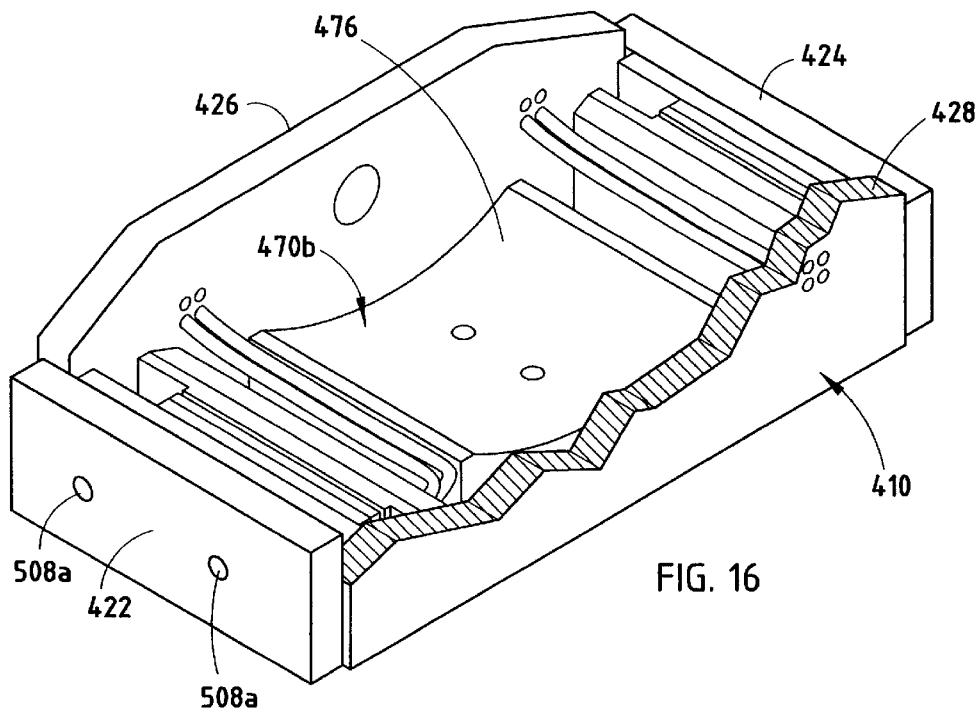
FIG. 16 is a fragmentary perspective view of the structure shown in FIG. 15, with the force-sensing unit installed therein.

FIG. 14 depicts how the pads 500 and 504 and their associated horizontal sensors 440 and 441 are mounted within a recess 490 formed in the body 475 of the force-sensing unit 470a. The horizontal sensors 444 and 445, mounted within pads, are positioned within the force-sensing unit 470b in a substantially similar manner. As is best shown in FIG. 17, the sensor 440 is embedded within the pad 500. The pads 500 and 502 are mounted on opposite sides of a downwardly extending intermediate plate 501. Each of the plates 501 includes a rectangular seat 503 for receiving a pad, such as pad 500 illustrated in FIGS. 14 and 17. The outer walls 510 and 512 of the recesses 490 have rectangular apertures 511 therethrough to receive elastomeric pads. For example, the pad 502 is mounted on end plate 520 to engage pad 500 for preloading its associated sensor 540 as is further described below. End plates 422 and 424 extend over the outer plates 520 and 522 and include apertures 508 for receiving a pair of spaced threaded fasteners 507 at the forward and aft sides of each of the two sensing units for preloading the sensors for each of the two sensing units. The fasteners 507 are threadibly received by threaded apertures 505 in the plates 501.

As is best shown in FIG. 13, the tightening of the fasteners 507 compresses the elastomeric pads 500 and 502 and the corresponding pads 504 and 506 on the opposite sides of the force-sensing unit so as to preload the sensor 440 within the pad 500 and the sensor 441 within the pad 504. In one embodiment, the pads 500, 502, 504 and 506 have a dimension of approximately 73 mm by 36 mm and a thickness of approximately 13 mm. The assembly of the force-sensing unit 470a is further illustrated in FIG. 14 with the various pads being inserted into the force-sensing unit body 475, which in turn is mounted within the rectangular housing 420a, shown in FIG. 15, to which the pads 462 and 463 have been previously mounted. With the force-sensing unit partially assembled, the fasteners 507 are extended through apertures 508a, 508 and into the apertures 505 in the plates 501 of the assembly to preload the longitudinal sensors 440 and 441 contained within the elastomeric spring 500 and 504, respectively. In this manner, acceleration and deceleration forces can be sensed by each of the longitudinal sensors 440 and 441.

Each of the sensors 440–447 are coupled by conductors 540–547, e.g., coaxial conductors, which couple each of the sensors to interface electrical circuits 600 and 600' for processing signals received from each of the force-sensing units. A temperature sensor 590 may also be coupled to the fifth wheel 410 at a convenient location, such as on the wall 424 as is shown in FIG. 11, and coupled to at least an electrical circuit 600, via conductor 592. As is further shown in FIG. 18, sensors 440–447 are coupled to the circuits 600 and 600', which may be voltage controlled oscillators, which respond to changes in a signal to change the frequency thereof, which frequency can be converted to a digital signal representative of the frequency and therefore, the signal, which is related to the force applied to the sensors from the trailer applying pressure on the fifth wheel.

Typical forces on the vertical sensors 442, 443, 446 and 447 range from approximately 0 up to 160,000 Newtons on the left-side and right-side. Longitudinal forces applied to the longitudinal sensors 440, 441, 444 and 445 vary from about −80,000 Newtons to about +80,000 Newtons. As shown, the circuits 600 and 600' are coupled by a single electrical connector 710 mounted to the under-surface of the fifth wheel 410 and coupled to the electrical circuit 720 mounted to the vehicle itself. Circuit 720 includes a microprocessor 730 that is coupled to the conductors 710, through a suitable interface circuit 740 and to an information display 750 via a cable 755 in a conventional manner. The microprocessor 730 may be programmed to, for example, apply correction factors for the elastomeric material as a function of temperature, among other functions.

The signals provided by the sensors 440–447 may also be supplied to a tractor control module 760, which may limit brake activity for safe deceleration of a vehicle and trailer or may provide warning signals to a driver indicating excessive pitch, yaw and/or roll such that the driver can respond to the audible or visual alarm signals to control the tractor in a safe manner.

It should be appreciated that the outputs of the sensor may also potentially be used to detect conditions/faults (e.g., the force of a kingpin against a plate may substitute for a kingpin sensor) and in systems that implement coupling detection the display and processor may be shared. For example, the system described herein may be implemented with a coupling alignment warning system as is described in U.S. patent application Ser. No. 09/836,796, (now U.S. Pat. No. 6,592,230), filed Apr. 17, 2001, and entitled "TRUCK REARVIEW MIRROR ASSEMBLY HAVING A DISPLAY FOR DISPLAYING TRAILER COUPLING STATUS INFORMATION," which is a continuation-in-part of U.S. patent application Ser. Nos. 08/951,250 (now U.S. Pat. No. 6,252,497), filed Oct. 16, 1997, and entitled "COUPLING ALIGNMENT WARNING SYSTEM" and Ser. No. 09/493,534, (now U.S. Pat. No. 6,285,278), filed Jan. 28, 2000, and entitled "ELECTRONIC SYSTEM FOR MONITORING A FIFTH WHEEL HITCH." The entire disclosures of U.S. patent application Ser. Nos. 09/836,796; 08/951,250; and 09/493,534 are hereby incorporated herein by reference.

It will become apparent to those skilled in the art that various modifications to the preferred embodiments of the invention as described herein can be made without departing from the spirit or scope of the invention as defined by the appended claims.

What is claimed is:

1. A force-sensing fifth wheel assembly, comprising:
    a fifth wheel having a left-side pocket and a right-side pocket in a lower side thereof for receiving a force-sensing unit in each of the pockets;
    a left-side force-sensing unit mounted in the left-side pocket, the left-side force-sensing unit including:
        a first left-side vertical sensor positioned forward of a lateral axis of the fifth wheel;
        a second left-side vertical sensor positioned rearward of the lateral axis of the fifth wheel;
        a first left-side horizontal sensor positioned forward of the lateral axis of the fifth wheel; and
        a second left-side horizontal sensor positioned rearward of the lateral axis of the fifth wheel; and a right-side force-sensing unit mounted in the right-side pocket, the right-side force-sensing unit including:
  a first right-side vertical sensor positioned forward of the lateral axis of the fifth wheel;
  a second right-side vertical sensor positioned rearward of the lateral axis of the fifth wheel;
  a first right-side horizontal sensor positioned forward of the lateral axis of the fifth wheel; and
  a second right-side horizontal sensor positioned rearward of the lateral axis of the fifth wheel, wherein the left-side and right-side force-sensing units provide a total of eight channels of force-sensing information.

2. The assembly of claim 1, wherein the force-sensing information allows total vertical load, longitudinal load, roll, pitch and yaw to be determined with respect to the coupling of a trailer to the fifth wheel of a tractor.

3. The assembly of claim 1, wherein the sensors are each embedded within an elastomeric pad.

4. The assembly of claim 3, wherein the elastomeric pads are made of one of rubber and polyurethane.

5. The assembly of claim 1, wherein the sensors are one of pressure sensitive films, ceramic load buttons and cylindrical piezoceramic elements.

6. The assembly of claim 1, wherein the left-side and right-side force-sensing units each include a body having recesses for receiving each of the sensors.

7. The assembly of claim 6, wherein the body further includes recesses for receiving elastomeric springs associated with each of the sensors.

8. The assembly of claim 7, wherein each of the horizontal sensors include a pair of serially coupled elastomeric springs and a fastener for compressibly preloading the horizontal sensors.

9. The assembly of claim 8, further including:
  an electrical circuit coupled to the sensors for providing signal information associated with total vertical load, roll moment, pitch moment, yaw moment and longitudinal load.

10. The assembly of claim 9, further including:
  a display coupled to the electrical circuit for displaying at least one of the total vertical load, the roll moment, the pitch moment, the yaw moment, and the longitudinal load.

11. The assembly of claim 7, wherein the elastomeric springs are elastomeric pads made of one of rubber and a polymeric material.

12. The assembly of claim 11, wherein the pads for the vertical sensors have a width of about 70 mm, a length of about 90 mm and a thickness of about 15 mm.

13. The assembly of claim 12, wherein the springs for the horizontal sensors have a width of about 36 mm, a length of about 73 mm and a thickness of about 13 mm.

14. The assembly of claim 1, wherein the sensors are capacitive sensors.

15. A force-sensing unit for a fifth wheel assembly, comprising:
  a housing for coupling to a fifth wheel between a tractor mountable bracket and the fifth wheel;
  a first vertical sensor positioned in the housing forward of a lateral axis of the fifth wheel;
  a second vertical sensor positioned in the housing rearward of the lateral axis of the fifth wheel;
  a first horizontal sensor positioned in the housing forward of the lateral axis of the fifth wheel; and
  a second horizontal sensor positioned in the housing rearward the lateral axis of the fifth wheel, wherein the sensors provide a total of four channels of force-sensing information.

16. The assembly of claim 15, wherein the sensors are each embedded within an elastomeric pad.

17. The assembly of claim 16, wherein the elastomeric pads are made of one of rubber and polyurethane.

18. The assembly of claim 15, wherein the sensors are one of pressure sensitive films, ceramic load buttons and cylindrical piezoceramic elements.

19. The assembly of claim 15, wherein the housing includes elastomeric springs associated with each sensor.

20. The assembly of claim 19, wherein each of the horizontal sensors include a pair of serially coupled elastomeric springs and a fastener for compressibly preloading the horizontal sensors.

21. The assembly of claim 20, wherein the elastomeric springs are elastomeric pads made of one of rubber and a polymeric material.

22. The assembly of claim 21, wherein the pads for the vertical sensors have a width of about 70 mm, a length of about 90 mm and a thickness of about 15 mm.

23. The assembly of claim 22, wherein the pads for the horizontal sensors have a width of about 36 mm, a length of about 73 mm and a thickness of about 13 mm.

24. A force-sensing fifth wheel assembly comprising:
  a fifth wheel; and
  a pair of force-sensing units mounted on opposite sides of the fifth wheel, wherein each of the force-sensing units include a first vertical sensor positioned forward and a second vertical sensor positioned rearward of a lateral axis of the fifth wheel and a first horizontal sensor positioned forward and a second horizontal sensor positioned rearward of the lateral axis of the fifth wheel, wherein the pair of force-sensing units provide a total of eight channels of force-sensing information.

25. The assembly of claim 24, wherein the force-sensing information allows total vertical load, longitudinal load, roll, pitch and yaw to be determined with respect to the coupling of a trailer to the tractor.

26. The assembly of claim 24, wherein the sensors are each embedded within an elastomeric pad.

27. The assembly of claim 26, wherein the elastomeric pads are made of one of rubber and polyurethane.

28. The assembly of claim 24, wherein the sensors are one of pressure sensitive films, ceramic load buttons and cylindrical piezoceramic elements.

29. The assembly of claim 24, wherein the sensors are capacitive sensors.

30. The assembly of claim 24, wherein the fifth wheel includes a pair of pockets formed on an underside thereof for receiving the pair of force-sensing units.

31. The assembly of claim 24, wherein each of the force-sensing units include a body having recesses for receiving each of the sensors.

32. The assembly of claim 31, wherein the body further includes recesses for receiving elastomeric springs associated with each of the sensors.

33. The assembly of claim 32, wherein each of the horizontal sensors include a pair of serially coupled elastomeric springs and a fastener for compressibly preloading the horizontal sensors.

34. The assembly of claim 33, wherein the elastomeric springs are elastomeric pads.

35. A force-sensing unit for a fifth wheel assembly, comprising:
  a housing for coupling to a fifth wheel between a tractor mountable bracket and the fifth wheel;

a first vertical sensor positioned in the housing forward of a lateral axis of the fifth wheel;

a second vertical sensor positioned in the housing rearward of the lateral axis of the fifth wheel;

a first horizontal sensor positioned in the housing forward of the lateral axis of the fifth wheel; and a second horizontal sensor positioned in the housing rearward of the lateral axis of the fifth wheel, wherein the sensors provide a total of four channels of force-sensing information, and wherein the sensors are each embedded within an elastomeric pad.

36. The assembly of claim 35, wherein the elastomeric pads are made of one of rubber and polyurethane.

37. The assembly of claim 35, wherein the sensors are one of pressure sensitive films, ceramic load buttons and cylindrical piezoceramic elements.

38. The assembly of claim 35, wherein the housing includes a separate recess for receiving each of the vertical sensors.

39. The assembly of claim 35, wherein each of the horizontal sensors has an associated pair of serially coupled elastomeric pads and a fastener for compressibly preloading the horizontal sensors and coupling the housing to the fifth wheel.

* * * * *

UNITED STATES PATENT AND TRADEMARK OFFICE
CERTIFICATE OF CORRECTION

PATENT NO. : 6,739,611 B2
DATED : May 25, 2004
INVENTOR(S) : Jack L. Gisinger et al.

It is certified that error appears in the above-identified patent and that said Letters Patent is hereby corrected as shown below:

Column 1,
Line 7, after "424" insert -- ) --; and
Lines 8-9, delete "now U.S. Pat. No. 6,302,424".

Signed and Sealed this

Tenth Day of August, 2004

JON W. DUDAS
*Acting Director of the United States Patent and Trademark Office*